3,242,077
GREASE COMPOSITION
Max J. Wisotsky, University Park, Pa., and Norman R. Odell, Wappingers Falls, N.Y., assignors to Texaco Inc., New York, N.Y., a corporation of Delaware
No Drawing. Filed Dec. 14, 1962, Ser. No. 244,567
10 Claims. (Cl. 252—28)

This application is a continuation-in-part application of our patent application Serial number 205,131, filed June 25, 1962, now abandoned.

The present invention relates to lubricating grease compositions having improved characteristics and, more particularly, to non-soap thickened silicon base grease compositions having improved dropping points and resistance to oil bleeding.

In commonly assigned U.S. 2,880,176, there are disclosed high temperature grease compositions consisting essentially of methylchlorophenyl silicone polymer oils thickened with a particular group of high melting point diazo compounds, namely, the dichlorobenzidine pigments commercially used in baking finishes and as rubber pigments.

It has been found that these grease compositions comprising a silicone polymer base fluid thickened with dichlorobenzidine type pigments are not always completely satisfactory in meeting high temperature requirements of Military Specification 25013C. The dropping point and oil separation values of such greases at high working temperatures fail to meet the requirements set forth in Military Specification 25013C. This specificaiton requires the grease to exhibit a dropping point value of at least 450° F. and an oil separation value (bleeding point), after being subjected to a temperautre of 450° F. for 30 hours of not more than 7.5 percent by weight.

It has now been found that the incorporation of a thickening agent obtained by the addition of a microdimensional pyrogenic silicon dioxide to a dichlorobenzidine pigment in a particular type of oleaginous silicone polymer fluid results in unexpected advantages with respect to the oil separation values and dropping point properties of the resulting grease compositions.

In accordance with the present invention, the grease compositions comprise a chlorophenyl silicone polymer base fluid thickened with a thickening agent consisting of as one thickening component, a dichlorobenzidine compounds having the general formula

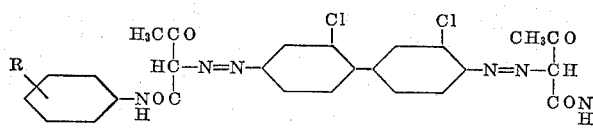 

wherein R is hydrogen, chlorine, methoxy or a lower alkyl group, and as the other thickening component, finely divided pyrogenic silicon dioxide.

The amounts of the composite thickening agent in the silicone polymer base fluid may vary from about 10 up to about 40 per cent by weight of the composition, the balance being the base fluid with or without added oxidation inhibitors, stringiness agents and the like.

The dichlorobenzidine pigment is the major component of the thickening agent. The dichlorobenzidine component should be present in an amount of from about 1.5 up to about 5 parts by weight of pigment per part of pyrogenic silicon dioxide. Expressed as a percentage of the grease composition, the dichlorobenzidine thickening agent component should be present in an amount between about 5 and 35 percent by weight, the pyrogenic silicon dioxide component being at least 3 percent by weight thereof, and may be up to 12 percent by weight. It is preferred that the dichlorobenzidine pigment thickening component be present in the grease in an amount between 10 and 25 percent, the balance of the thickening agent, between about 4 and 10 percent being pyrogenic silicon dioxide.

Silicone polymer grease compositions containing this composite thickening agent meet the rigid requirements for dropping point and oil separation values specified in MIL Spec. 25013C.

The dichlorobenzidine pigment component of the composite thickening agent can be prepared by diazotizing 3,3'-dichlorobenzidine, such as for example, by reaction with nitrous acid in the presence of a strong acid, such as hydrochloric acid, and thereafter reacting the diazotized product with N-aryl acetoacetamide or derivative thereof having lower alkyl or chlorine substituents upon the phenyl groups as for example, by the method described in German Patent 251,479 (1912). A particularly effective dichlorobenzidine thickening component has been found to be bis (acetyl-N-o-methoxyphenylcarbamylmethyl)4,4'-disazo-3,3'-dichlorodiphenyl, sold under the trade name "Majestic Yellow" pigment by Imperial Paper and Color Co. Other dichlorobenzidine pigments, such as bis (acetyl-N-phenylcarbamylmethyl) 4,4'-disazo-3,3'-dichlorodiphenyl, bis (acetyl-N-m-xylylcarbamylmethyl) 4,4'-disazo-3,3'-dichlorodiphenyl, bis (acetyl-N-2,5-dichlorophenylcarbamylmethyl) 4,4'-disazo-3,3'-dichlorodiphenyl and bis ( acetyl-N-o-tolylcarbamylmethyl) 4,4'-disazo-3,3'-dichlorodiphenyl, can be used advantageously as the pigment component of the grease compositions of the present invention.

The dichlorobenzidine compounds which are employed as one of the thickening components are generally used in finely divided form, ordinarily in the form of particles below about one micron in diameter, and preferably below about 0.5 micron in diameter which may be obtained either by suitably controlling the crystallization conditions during the preparation or by fine grinding. They may be employed either in pure form or in the form of the so-called reduced toners, wherein the compounds are deposited upon particles of inert inorganic materials, such as $SiO_2$, $Al_2O_3$, $TiO_2$, $BaSO_4$, clay, etc. Generally, such inorganic materials will be present only in minor amounts, such as up to about 10 percent by weight of the thickening agent, but larger amounts up to about 25 percent by weight or higher may be present if desired. In addition, the compounds may contain small amounts, such as up to about 5 percent by weight of the thickening agent of various metal salts, particularly metal chlorides, such as zinc chloride, ferric chloride, stannic chloride, or cadmium chloride, which may enter into the crystal structure in some manner which is not entirely understood when such salts are present in the reaction mixture during the crystallization.

The grease compositions of this invention contain, as the other thickening agent component, a minor amount of microdimensional particles of a pyrogenic silicon dioxide prepared by flame hydrolysis. The pyrogenic silicon dioxide particles have an average particle diameter in the range of from about 100 to 400 Angstroms. A pyrogenic silicon dioxide known by the trade name Cab- O-Sil has been found to be particularly effective in the compositions of this invention. This ultrafine silicon dioxide has an average particle diameter in the range of from 150 to 250 Angstroms and a surface area of about 175 to 200 square meters per gram. The pyrogenic silicon dioxide thickening component can be used in minor amounts in the thickening agent component in the greases of the present invention, such as, from about 3 up to about 12 percent by weight, based on the weight of the composition. Excellent results can be obtained using amounts of pyrogenic silicon dioxide thickening agent component in the range of from 4 to 10 percent by weight, based on the weight of the composition.

The use of a pyrogenic silicon dioxide in amounts less than 3 percent by weight as a co-thickener with a dichlorobenzidine pigment, particularly a Majestic Yellow pigment, is not effective to impart improved high temperature dropping point and oil separation values of the greases of this invention.

The methylchlorophenyl silicones which are employed in these greases are compounds having the formula

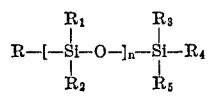

wherein R, $R_1$, $R_2$, $R_3$, $R_4$, and $R_5$ are methyl, phenyl or chlorinated phenyl groups, preferably, at least, about 35 percent of such groups being methyl groups and with sufficient chlorinated phenyl groups to give a chlorine content of at least about 3 percent by weight to the polymer, and $n$ is an integer of sufficient size to give a polymer having a viscosity in the lubricating oil viscosity range. The preferred silicone oils are those having a viscosity in the range from about 100 seconds to 600 seconds Saybolt Universal at 100° F., and containing about 4 to 12 percent by weight of chlorine. A particularly suitable material of this character is the commercial product sold under the trade name "Versilube F-50," having an average molecular weight of about 3,233, a viscosity of about 180 to 280 seconds Saybolt Universal at 100° F. and contains about 33.6 percent silica and 7.18 percent of chlorine by weight by analysis. Another suitable silicone polymer base fluid sold under the trade name "Dow F-60" can be used in the grease compositions of the invention.

The methylchlorophenyl silicone polymer may be employed as the sole oil component, or it may be employed in admixture with minor amounts of other oils, particularly other synthetic oils, such as polyethers, polyglycols, diesters, polyesters or mixtures of such oils.

The grease compositions of this invention can also contain minor amounts, i.e., 0.5 to 10 percent by weight of the composition of oxidation and corrosion inhibitors, stringiness agents, tackiness agents, lubricity agents, coloring materials and the like.

Suitable oxidation inhibitors include aryl amines, such as diphenylamine, alpha- and beta-naphthlyamine, paraphenylene diamine and N,N'-diphenyl-p-phenylenediamine. Satisfactory corrosion inhibitors include, for example, lead naphthenate, sarcosine, N-acyl sarcosines and particularly N-cocoyl sarcosine.

The use of dichlorobenzidine pigments as the sole thickening agent in a silicone polymer base fluid does not provide a grease composition having satisfactory dropping point and oil separation values at high temperatures when such values are determined under the requirements of MIL Spec. 25013C. Moreover, the use of the dichlorobenzidine pigments in the form of a reduced toner, i.e, containing a minor amount of an inert organic material, such as silica or alumina as the thickening agent in silicone polymer base, oil grease compositions does not impart satisfactory high temperature dropping point and oil separation values to the resultant greases to meet the requirements of MIL Spec. 25013C for these tests.

It is necessary to use the combination of the dichlorobenzidine pigment component with the finely divided pyrogenic silicon dioxide component to form a satisfactory thickening agent for silicone polymer greases that meet the requirements of this specification for dropping point and oil separation values.

The grease compositions of this invention can be prepared in a known manner, such as by intimately mixing the thickening agent components, a dichlorobenzidine pigment and pyrogenic silicon dioxide, with the silicone polymer base oil in a colloid mill to obtain a thorough dispersion of the pigment and pyrogenic oxide in the silicone oil. The mixing operation can be carried out at ordinary or elevated temperatures up to about 300° F. Corrosion and oxidation inhibitors can be added to the admixed composition in a conventional manner and mixing continued to produced a uniform mixture.

EXAMPLE 1

The grease was prepared by charging into a steam heated grease kettle equipped with a mechanical stirring device 150 parts of bis (acetyl-N-o-methoxyphenylcarbamylmethyl) 4,4'-disazo-3,3'-dichlorodiphenyl (Majestic Yellow Pigment), 50 parts of pyrogenic silicon dioxide, sold under the trade name "Cab-O-Sil," H5 grade, and 950 parts of Versilube F-50, a methylchlorophenyl silicone polymer oil having an average molecular weight of about 3,233, and containing 33.6 percent silica and 7.18 percent chlorine on a weight basis. The ingredients were intimately mixed and milled at a temperature of 180° F. and passed twice through a Premier Colloid mill having a clearance of 0.002 inch. The resultant buttery yellow product grease had a dropping point above 500° F. and an oil separation value of 5.5 percent after being heated for 30 hours at 450° F.

EXAMPLES 2 TO 4 INCLUSIVE

Following the procedure of Example 1 other grease compositions were prepared in a similar manner. The composition of these greases are shown in Table I below.

CONTROL EXAMPLE A

Following the procedure of Example 1 above, a grease composition was prepared in a similar manner except that no pyrogenic silicon dioxide thickening component was present. The composition of this grease is shown in Table I below.

CONTROL EXAMPLE B

Following the procedure of Example 1 above, a grease composition was prepared containing 2.6 percent pyrogenic silicon dioxide thickening component. The composition of this grease is set forth in Table 1 below. This grease was prepared to show that the use of less than 3 percent by weight of pyrogenic silicon dioxide thickening component with a dichlorobenzidine pigment was not effective in providing a grease composition meeting the requirements of MIL Spec. 25013C as to dropping point and oil separation values.

Table I

| Composition, Wt. Percent | Control | | Examples | | | |
|---|---|---|---|---|---|---|
| | A | B | 1 | 2 | 3 | 4 |
| Majestic Yellow Pigment | 200 | 15.3 | 13.0 | 12.4 | 21.4 | 16.5 |
| H-5 Cab-O-Sil | | 2.6 | 4.4 | 4.1 | 6.4 | 5.5 |
| Versilube F-50 [1] | 79.5 | 82.1 | 82.6 | 83.0 | 71.2 | |
| Dow F-60 [2] | | | | | | 76.7 |
| Uversol Zinc [3] | | | | | 1.0 | 1.0 |
| Zinc Naphthenate | | | | | 0.3 | 0.3 |
| Sarkosyl LC [4] | 0.5 | | | 0.5 | | |

[1] Methylchlorophenylsilicone polymer, MW 3233 (33.6% $SiO_2$, 7.18% Cl).
[2] Chlorinated silicone polymer, Kinematic Viscosity at 100° F. 52.5, Pour Point below −75° F. (4.7% Cl).
[3] 10% solution zinc naphthenate—Corrosion Inhibitor.
[4] N-cocoyl sarcosine (free acid)—Corrosion Inhibitor.

Inspection tests of the grease compositions of Table I are shown in Table II below.

Table II

| Tests | MIL Spec. G-25013C | Control A | Control B | Example 1 | Example 2 | Example 3 | Example 4 |
|---|---|---|---|---|---|---|---|
| Penetration:[1] | | | | | | | |
|   Unworked | | 207 | 245 | 227 | 203 | 208 | 173 |
|   Worked 60 strokes | 260–330 | 268 | 320 | 307 | 300 | 289 | 310 |
|   Worked Stability 10⁵ Strokes | [2] 375 | 346 | | 357 | 325 | 314 | |
| Dropping Point, °F | [3] 450 | 447 | 500+ | 500+ | 500+ | 500+ | 500+ |
| Oil Separation (Bleeding), 30 hrs., 450° F., Percent Loss | [2] 7.5 | 8.7 | 9.9 | 5.5 | 1.4 | 2.2 | 0.6 |
| High Temperature Performance, hrs. to failure at 450° F | [3] 500 | | | 747 | | | |
| Dynamic Water Resistance Test, Percent Loss | [2] 5.0 | | | 0 | 0 | 0 | 0 |
| Oil Evaporation Test, 22 hrs., 400° F., Percent Loss | [2] 4 | | | | | 3.9 | 4.0 |
| ASTM Bomb Oxidation Test, 100 hrs., 250° F., lbs. Drop | [2] 5 | | | | | 2 | 0 |
| Copper Strip Corrosion Test, 24 hrs., 212° F., rating | ([4]) | | | | | ([4]) | ([4]) |

[1] Converted to ASTM from ¼ cone, ½ worker used.
[2] Maximum.
[3] Minimum.
[4] Pass.

The data in Table II above, Example A, show that the dropping point and oil separation values of a grease composition comprising a chlorophenyl silicone polymer base fluid containing only a thickening agent of dichlorobenzidine pigment, Majestic Yellow, but without any pyrogenic silicon dioxide, does not meet the requirements set forth in MIL Spec. 25013C. The data presented in Table II above, for Example B, illustrate that the use of an amount of less than 3 percent by weight of pyrogenic silicon dioxide thickening component with a dichlorobenzidine pigment thickening component in a silicone polymer grease is likewise unsatisfactory when determined by MIL Spec. 25013C with respect to the dropping point and oil separation values.

The data set forth for the grease compositions of Examples 1 to 4 inclusive in the table, illustrate that grease compositions containing from 3 to 8 percent by weight of pyrogenic silicon dioxide possess dropping point and oil separation values within the requirements of MIL Spec. 25013C. These examples show that the grease compositions of the present invention, namely, grease compositions containing at least 3 percent by weight of a pyrogenic silicon dioxide thickening component with a dichlorobenzidine pigment in a chlorophenyl silicone polymer base thickening component are superior as to their dropping point and oil separation values in comparison with silicone grease compositions containing less than 3 percent pyrogenic silicon dioxide thickening component, and a dichlorobenzidine thickening component or greases containing no pyrogenic silicon dioxide thickening component.

We claim:

1. A lubricating grease composition comprising from about 60 to 90 percent by weight of a methylchlorophenyl silicone polymer oil of lubricating viscosity thickened to a grease consistency with from about 10 to 40 percent by weight of a thickening agent consisting of a mixture of a finely divided pyrogenic silicon dioxide and a dichlorobenzidine pigment having the formula

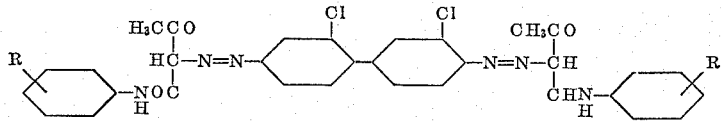

wherein R represents a member selected from the group consisting of hydrogen, chlorine, methoxy, and a lower alkyl group, said dichlorobenzidine pigment being present in the composition in weight ratio of from about 1.5 to 5 times per part by weight of said silicon dioxide, said silicon dioxide being present in an amount between 3 and 12 percent by weight.

2. A grease composition as claimed in claim 1 wherein said silicone polymer oil has a viscosity in the range of from about 100 to 600 seconds Saybolt Universal at 100° F., and contains between about 4 to 12 percent by weight of chlorine.

3. A grease composition as claimed in claim 1 wherein said dichlorobenzidine component is bis(acetyl-N-o-methoxyphenylcarbamylmethyl)4,4'-disazo-3,3'-dichlorodiphenyl.

4. A grease composition as claimed in claim 1, wherein said dichlorobenzidine component is bis(acetyl-n-phenylcarbamylmethyl)4,4'-disazo-3,3'-dichlorodiphenyl.

5. A grease composition as claimed in claim 1, wherein said dichlorobenzidine component is bis(acetyl-n-m-xylylcarbamylmethyl)4,4'-disazo-3,3'-dichlorodiphenyl.

6. A grease composition as claimed in claim 1, wherein said dichlorobenzidine component is bis(acetyl-N-2,5-dichlorophenylcarbamylmethyl)4,4'-disazo-3,3' - dichlorodiphenyl.

7. A grease composition as claimed in claim 1, wherein said dichlorobenzidine component is bis(acetyl-N-o-tolylcarbamylmethyl)4,4'-disazo-3,3'-dichlorodiphenyl.

8. A grease composition as claimed in claim 1 wherein said pyrogenic silicon dioxide component of said thickening agent has an average particle size of about 150 to 250 A. and a surface area of about 175 to 200 meters per gram.

9. A grease composition as claimed in claim 1 containing about 0.5 percent by weight of a corrosion inhibitor and about 0.5 percent of an oxidation inhibitor, on a weight basis.

10. A grease composition as claimed in claim 1 consisting essentially of from 65 to 86 percent of said silicone polymer oil, 10 to about 25 percent of bis(acetyl-N-o-methoxyphenylcarbamylmethyl)4,4′-disazo-3,3′-dichlorodiphenyl and from about 4 to about 10 percent of finely divided pyrogenic silicon dioxide, on a weight basis.

References Cited by the Examiner
UNITED STATES PATENTS

| | | | |
|---|---|---|---|
| 2,880,176 | 3/1959 | Roach et al. | 252—49.6 |
| 3,037,933 | 6/1962 | Wright | 252—28 |
| 3,102,860 | 9/1963 | Zakin | 252—28 |
| 3,102,861 | 9/1963 | Zakin | 252—28 |
| 3,126,341 | 3/1964 | Zakin | 252—28 |

FOREIGN PATENTS 846,647    8/1960    Great Britain.

DANIEL E. WYMAN, *Primary Examiner.*

UNITED STATES PATENT OFFICE
CERTIFICATE OF CORRECTION

Patent No. 3,242,077                            March 22, 1966

Max J. Wisotsky et al.

It is hereby certified that error appears in the above numbered patent requiring correction and that the said Letters Patent should read as corrected below.

Column 4, line 16, for "produced" read -- product --; same column 4, Table I, second column, line 1 thereof, for "200" read -- 20 --; column 6, lines 37 to 43, the right-hand portion of the formula should appear as shown below instead of as in the patent:

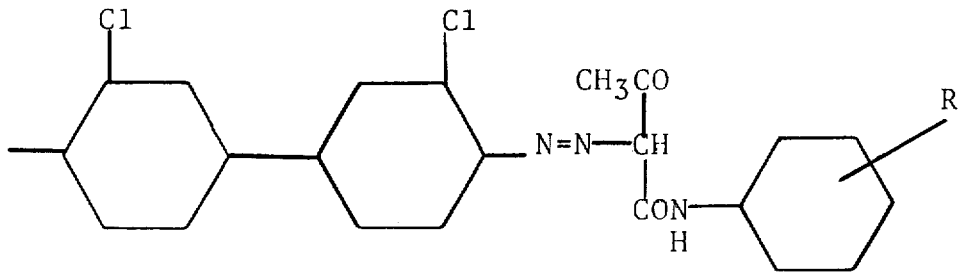

same column 6, lines 61 and 64, for "bis(acetyl-n-", each occurrence, read -- bis(acetyl-N- --.

Signed and sealed this 15th day of August 1967.

(SEAL)
Attest:

EDWARD M. FLETCHER, JR.                               EDWARD J. BRENNER
Attesting Officer                                           Commissioner of Patents